(12) United States Patent
Cakmak et al.

(10) Patent No.: US 12,269,166 B2
(45) Date of Patent: Apr. 8, 2025

(54) INTEGRATION OF PLASMA PROCESSING AND ROBOTIC PATH PLANNING

(71) Applicant: Hypertherm, Inc., Hanover, NH (US)

(72) Inventors: Garen Cakmak, Montreal (CA); Daniel Marcovici, Sao Paulo (BR); Jacques Barbe, Montreal (CA); Emile Bouthillier, Montreal (CA)

(73) Assignee: Hypertherm, Inc., Hanover, NH (US)

( * ) Notice: Subject to any disclaimer, the term of this patent is extended or adjusted under 35 U.S.C. 154(b) by 346 days.

(21) Appl. No.: 17/689,267

(22) Filed: Mar. 8, 2022

(65) Prior Publication Data

US 2022/0288779 A1    Sep. 15, 2022

Related U.S. Application Data

(60) Provisional application No. 63/158,794, filed on Mar. 9, 2021, provisional application No. 63/158,799, filed on Mar. 9, 2021.

(51) Int. Cl.
  *B25J 9/00*    (2006.01)
  *B23K 10/00*    (2006.01)
  (Continued)

(52) U.S. Cl.
  CPC ............. *B25J 9/1664* (2013.01); *B23K 10/00* (2013.01); *B23K 37/0229* (2013.01);
  (Continued)

(58) Field of Classification Search
  CPC ...... B25J 9/1664; B25J 9/1661; B25J 9/1671; B25J 15/0019; B23K 10/00;
  (Continued)

(56) References Cited

U.S. PATENT DOCUMENTS 10,754,337 B2    8/2020    Keshmiri et al.
11,198,182 B2 *  12/2021   Worthing, Jr. .......... B22F 10/85
                           (Continued)

OTHER PUBLICATIONS

"European Search Report and Written Opinion," European Application No. 22161170.0-1205, Applicant: Hypertherm, Inc., Date of Mailing: Aug. 3, 2022, pp. 1-20.
(Continued)

*Primary Examiner* — Ian Jen
(74) *Attorney, Agent, or Firm* — Cesari and McKenna, LLP

(57) ABSTRACT

The present invention features a computer-implemented method of planning a processing path relative to a three-dimensional workpiece for a plasma arc cutting system coupled to a robotic arm. The method includes receiving input data from a user comprising (i) Computer-Aided Design (CAD) data for specifying a desired part to be processed from the three-dimensional workpiece, and (ii) one or more desired parameters for operating the plasma arc cutting system. A plurality of features of the desired part to be formed on the three-dimensional workpiece are identified based on the CAD data. The method also includes dynamically filtering a library of cut charts based on the plurality of features and the desired operating parameters to determine a recommended cut chart for processing the plurality of features. The method further includes generating the processing path based on the recommended cut chart and the plurality of features to be formed.

40 Claims, 9 Drawing Sheets

(51) Int. Cl.
*B23K 37/02* (2006.01)
*B25J 9/16* (2006.01)
*B25J 15/00* (2006.01)

(52) U.S. Cl.
CPC .......... *B25J 9/1661* (2013.01); *B25J 9/1671* (2013.01); *B25J 15/0019* (2013.01); *G05B 2219/35012* (2013.01); *G05B 2219/39001* (2013.01)

(58) Field of Classification Search
CPC .............. B23K 37/0229; B23K 10/006; G05B 2219/35012; G05B 2219/39001; G05B 2219/35167; G05B 19/4099; G05B 2219/40339; G05B 2219/40476; G05B 2219/40503; G05B 2219/40515

See application file for complete search history.

(56) References Cited

U.S. PATENT DOCUMENTS

| | | | |
|---|---|---|---|
| 11,213,920 B2* | 1/2022 | Stempfer | B29C 64/153 |
| 11,241,753 B2* | 2/2022 | Struksnes | B23K 9/26 |
| 2011/0290767 A1 | 12/2011 | Muscat-Tyler et al. | |
| 2019/0101894 A1 | 4/2019 | Henning et al. | |
| 2020/0139546 A1 | 5/2020 | Kerfeld et al. | |
| 2021/0379685 A1* | 12/2021 | Sato | B23K 9/16 |
| 2021/0387420 A1* | 12/2021 | Greene | B29C 64/129 |
| 2021/0404653 A1* | 12/2021 | Eßer | B22F 5/10 |
| 2022/0040780 A1* | 2/2022 | Pfaff | G05B 19/4097 |

OTHER PUBLICATIONS

Shi, Lei, et al., "Plasma Beam Radius Compensation-integrated Torch Path Planning for CNC Pipe Hole Cutting with Welding Groove," The International Journal of Advanced Manufacturing Technology, Springer, Springer-Verlag London, vol. 88, No. 5, May 26, 2016, pp. 1971-1981.

* cited by examiner

INTEGRATION OF PLASMA PROCESSING AND ROBOTIC PATH PLANNING

CROSS REFERENCE TO RELATED APPLICATION

This application claims the benefit of and priority to U.S. Provisional Patent Application Nos. 63/158,799 and 63/158,794, both of which filed on Mar. 9, 2021, and the entire contents of which are owned by the assignee of the instant application and incorporated herein by reference in their entireties.

TECHNICAL FIELD

The present invention generally relates to computer-implemented systems and methods for planning a processing path in a three-dimensional environment for a plasma arc processing system coupled to a robotic system.

BACKGROUND

In the field of material processing (e.g., cutting or marking) using industrial processing systems (e.g., plasma, waterjet, or laser systems), a variety of consumables need to be selected for each system to achieve varied cuts, effects, treatments, and performance. In addition, different processes and different features usually require different operating parameter settings for the consumables to accomplish the desired results, such as different cut speeds, stand-off distances, angles, power outputs, etc. In a two-dimensional environment (e.g., on a cutting table with a gantry), these requirements are fairly straightforward to realize and maintain. For example, in a two-dimensional environment, the desired speed for operating a cutting torch can be determined by referencing traditional cut charts. However, in three-dimensional applications, a robotic system is often introduced to automate processing of workpieces by a processing torch. In these situations, the number and complexity of available motions, controls, and solutions are greatly increased, thereby requiring customized design of processing paths that incorporate robotic limitations, tolerances, capabilities, efficiency considerations, robot envelope considerations, etc.

To design a cut path for an integrated robotic processing system for processing a desired part from a three-dimensional workpiece, proper consumable selection for the processing system is needed. Consumable selection impacts the path planning process for a given cut, process, and/or workpiece since each different size and shape of consumable can require different path planning to make sure that the simulation has no errors or collisions (e.g., as a result of differing dimensions and shapes among different consumables). Traditionally, consumable selection for a given cut or process is made by an operator with the knowledge and ability to manually manage a wide variety of consumables useable on a given system. However, the management capabilities required to handle an extensive library of consumables is very time consuming and error prone without automation.

Furthermore, when designing a cut path, a high volume of input data corresponding to choices and decisions need to be made in various path planning stages, the management of which can be burdensome to both the end user and the computing device. These planning stages include path creation, process simulation, and process output. For example, during path creation, the feature selection data and input process data affects a number of choices and decisions, including how the path is generated, the cutting direction, compensation side selection, kerf offsets, various process heights, etc. A compensation side involves the offset side of a cut with respect to a workpiece geometry, which can depend on the cut direction (e.g., clockwise or counterclockwise for cutting a hole). Due to the vortex nature of the plasma beam, the cutting direction and the compensation side cannot be chosen arbitrarily and is methodically determined using the process data received at this planning stage. As another example, input motion data can be used to control the process itself, such as the plasma or waterjet cutting parameters that directly interface with the process source machine which further complicates setting choices/decisions.

Currently these choices and decisions regarding consumable selection and path planning are made manually by humans, which is time consuming, prone to errors, and ultimately inefficient/inaccurate. While the flexibility of being able to influence and adjust these different factors gives rise to different design opportunities, the bevy of available design choices also impacts system efficiency and cut results, further complicating the design process. In addition, cutting complex parts from a workpiece often require multiple cuts, where every cut has a different set of parameters that need to be selected and set by an end user by weighing and adjusting available input values against the impact on various outputs, which makes management and design of these processes complicated without automation.

Therefore, systems and methods are needed to automatically generate a processing path for an integrated robotic processing system, including selecting a set of suitable consumables and parameter settings for configuring the processing system and determining an optimized sequence of motions for the robotic system, with the ultimate goal of processing desired part(s) relative to a workpiece in a three-dimensional environment.

SUMMARY

The present invention features systems and methods for considering multiple variables and outcomes to automatically determine a processing path to process one or more desired parts from a workpiece in a three-dimensional environment using a combination of a processing system coupled to a robotic system. These variables and outcomes can include position, orientation, motion type, speeds, cut quality, tolerances, torch angularity/perpendicularity relative to the workpiece surface, robotic capabilities, plasma arc dynamics, plasma arc motion characteristics, etc. In some embodiments, positions, orientation, and motion type are deduced from one or more features of the desired part(s) to be processed and one or more cut chart geometric parameters (e.g., pierce height). In some embodiments, the speed of the motion is drawn from the cut chart. In some embodiments, tolerances are defined by the user and can be applied when processing each feature or when programing the robotic system. These variables and outcomes can also include compensation for plasma arc dynamics in the processing path, which can be automatically determined/enforced by the instant systems and methods. In addition, designing the processing path can further comprise selecting a set of consumables and their operating parameters to simulate the processing system for achieving the desired processes. In general, the resulting processing path can represent an integration of cut chart selections and cut direction selections by applying cutting process parameters to multi-axis devices (robots and/or CNCs) in the context of path planning for applications such as plasma, waterjet, etc.

In one aspect, a computer-implemented method of planning a processing path relative to a three-dimensional workpiece is provided for a plasma arc cutting system coupled to a robotic arm. The method comprises receiving, by a computing device, input data from a user comprising (i) Computer-Aided Design (CAD) data for specifying at least one desired part to be processed from the three-dimensional workpiece, and (ii) one or more desired parameters for operating the plasma arc cutting system. The method includes identifying, by the computing device, a plurality of features of the at least one desired part to be formed on the three-dimensional workpiece based on the CAD data and dynamically filtering, by the computing device, a library of cut charts based on the plurality of features and the desired operating parameters to determine at least one recommended cut chart for processing the plurality of features. The recommended cut chart comprises a set of recommended process settings for the plasma arc cutting system. The method further comprises generating, by the computing device, the processing path based on the recommended cut chart and the plurality of features to be formed. The processing path is configured to plan motion of a plasma arc emitted from the plasma arc cutting system coupled to the robotic arm to process the plurality of features from the workpiece. The plasma arc cutting system is modeled using a set of one or more consumables selected based on the recommended cut chart. The planned motion of the plasma arc accounts for influences in plasma arc dynamics introduced to the plasma arc from operating the robotic arm in a three-dimensional environment.

In another aspect, a computer-implemented method for planning a processing path relative to a three-dimensional workpiece by a plasma arc cutting system coupled to a robotic arm is provided. The method includes receiving, by a computing device, (i) input data from a user comprising data for specifying at least one desired part to be processed from the three-dimensional workpiece, (ii) data related to the plasma arc cutting system and (iii) data for controlling the robotic arm, wherein the computing device is in electrical communication with a library of cut charts that provide different combinations of operating parameters for different processing types. The method also includes intelligently selecting, by the computing device, based on the user input data and the data related to the plasma arc cutting system at least one suitable cut chart from the library of cut charts to process the at least one desired part from the three-dimensional workpiece. The suitable cut chart specifies a set of process settings for configuring the plasma arc cutting system. The method additionally includes generating, by the computing device, a processing path about the three-dimensional workpiece in a first simulation by adapting the selected cut chart to a three-dimensional environment, including compensating for influences on plasma arc dynamics introduced during three-dimensional processing. The method further includes refining, by the computing device, the processing path from the first simulation in a second simulation by adding a sequence of motions for manipulating the robotic arm while the robotic arm ejects a plasma arc from the plasma arc cutting system to process the at least one desired part from the workpiece. The sequence of motions is generated using the data for controlling the robotic arm.

In yet another aspect, a computer-implemented expertise integration system for planning a processing path relative to a three-dimensional workpiece is provided. The expertise integration system is in electrical communication with a plasma arc cutting system coupled to a robotic arm. The expertise integration system comprises a computing device having a memory that stores programmatic instructions and a processor that executes the programmatic instructions to receive input data from a user comprising (i) Computer-Aided Design (CAD) data for specifying at least one desired part to be processed from the three-dimensional workpiece, and (ii) one or more desired parameters for operating the plasma arc cutting system. The programmatic instructions are additionally configured to identify a plurality of features of the at least one desired part to be formed on the three-dimensional workpiece based on the CAD data and dynamically filter a library of cut charts based on the plurality of features and the desired operating parameters to determine at least one recommended cut chart for processing the plurality of features. The recommended cut chart comprises a set of recommended process settings for the plasma arc cutting system. The programmatic instructions are further configured to generate the processing path based on the recommended cut chart and the plurality of features to be formed. The processing path plans motion of a plasma arc ejected from the plasma arc cutting system coupled to the robotic arm to process the plurality of features from the workpiece. The plasma arc cutting system is modeled using a set of one or more consumables selected based on the recommended cut chart. The planned motion of the plasma arc accounts for influences in plasma arc dynamics introduced to the plasma arc from operating the robotic arm in a three-dimensional environment.

Any of the above aspects can include one or more of the following features. In some embodiments, the processing path is generated by automatically identifying the set of one or more consumables based on the recommended cut chart, modeling the plasma arc cutting system using the set of one or more consumables and the recommended process settings provided by the recommended cut chart, and generating an initial simulation of the processing path that plans the motion of the plasma arc relative to the workpiece based on the plasma arc cutting system model and the recommended cut chart. In some embodiments, the initial simulation is generated by integrating the recommended cut chart with the plasma arc cutting system model while compensating for the influences in plasma arc dynamics introduced during processing in the three-dimensional environment.

In some embodiments, generating the processing path further comprises generating a refined simulation of the processing path based on the initial simulation by adding to the initial simulation a multi-axis robotics model that identifies a sequence of motions for manipulating the robotic arm. The refined simulation is adapted to manipulate the robotic arm to follow the processing path from the initial simulation. In some embodiments, the sequence of motions of the robotic arm is simulated based on data for controlling the robotic arm accessible by the computing device. In some embodiments, the data for controlling the robotic arm includes at least one of joint limitations, reach limitations, acceleration limitations or speed limitations of the robotic arm. In some embodiment, during the refined simulation, at least a portion of the processing path from the initial simulation is adjusted to account for one or more limitations of the robotic arm.

In some embodiments, the desired part is processed on the workpiece by actuating the robotic arm and activating the plasma arc processing system in accordance with the processing path. In some embodiments, the processing path is configured to control the robotic arm along at least 5 axes of motion relative to the workpiece which is defined by 3 axes.

In some embodiments, each cut chart in the library of cut charts specifies a suite of one or more parameters corresponding to a particular processing type. The one or more parameters comprise at least one of current, cut speed, workpiece material type, or workpiece material thickness. In some embodiments, the desired parameters for operating the plasma arc cutting system include at least one of swirl direction, cut height, cut speed, current, kerf width, pierce location, lead-ins, or consumable type. In some embodiments, the CAD data includes at least one of workpiece dimensions, desired part dimensions, or a reconstituted model of the workpiece.

In some embodiments, dynamically filtering a library of cut charts comprises presenting a set of operating options to the user by filtering the library of cut charts based on the input data to determine a set of possible cut charts that satisfy the input data. The set of operating options correspond to operating parameters offered by the set of possible cut charts. Dynamically filtering a library of cut charts also includes receiving user selection of desired operating options from the set of operating options and filtering the set of possible cut charts based on the user selection of desired operating options to drill down on the possible cut charts. In some embodiments, dynamically filtering a library of cut charts further includes successively performing the presenting, receiving and filtering steps until the recommended cut chart is identified from the possible cut charts. In some embodiments, the set of operating options are constrained by availability of one or more consumables of the plasma arc cutting system in an inventory accessible by the computing device. In some embodiments, the set of operating options present at least one of an operating parameter range, cost range and consumable quality range available for user selection. In some embodiments, a secondary recommendation is offered to the user if the library of cut charts does not include a cut chart that satisfies the user selection.

In some embodiments, the influences in plasma arc dynamics accounted for by the processing path include motion in X, Y and Z axes of torch angularity relative to the three-dimensional workpiece. In some embodiments, the influences in plasma arc dynamics accounted for by the processing path include at least one of cut direction for a given feature, swirl direction, cut height or kerf. In some embodiments, generating the processing path further comprises accounting for an age of at least one consumable component of the plasma arc cutting system.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
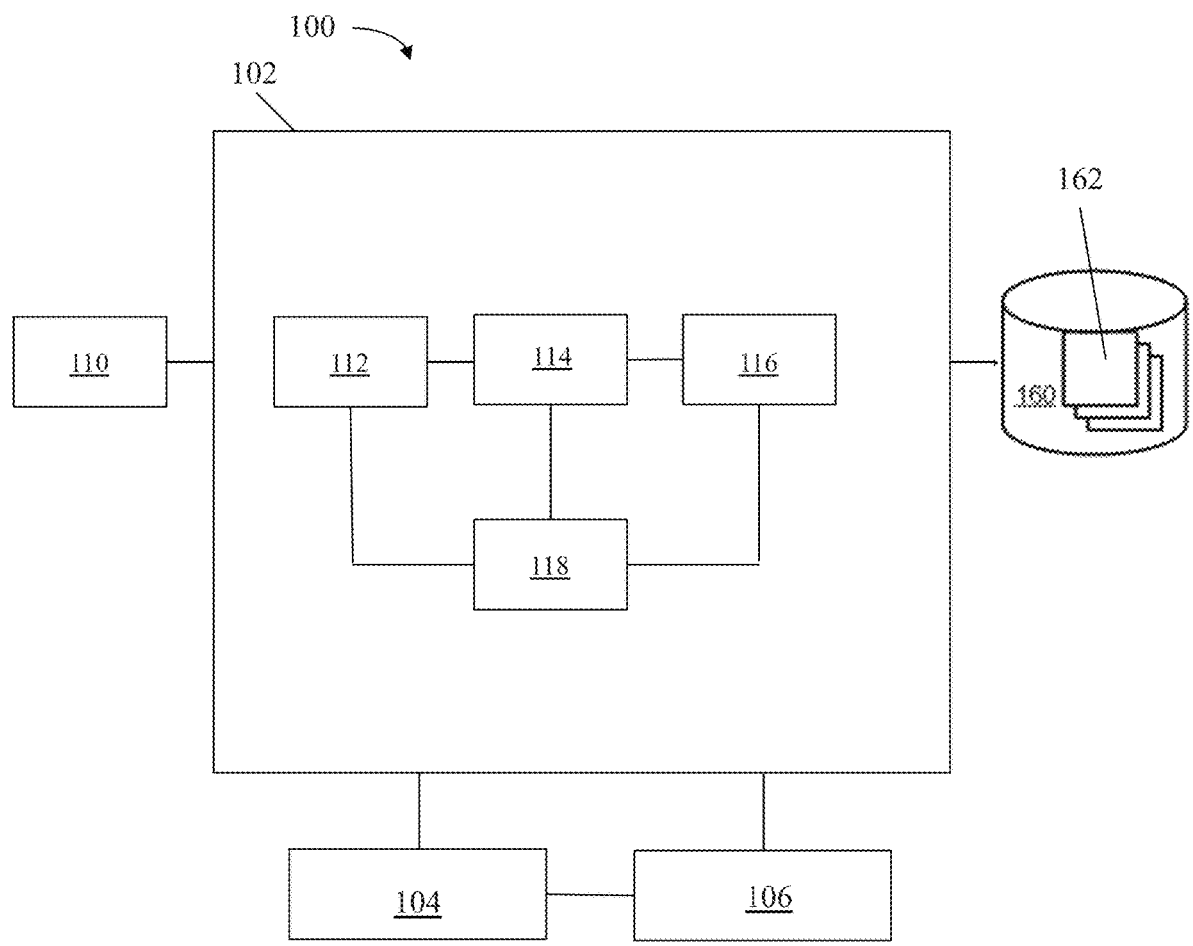
FIG. 1 shows a block diagram of an exemplary path planning system in a manufacturing facility for generating and simulating a processing path to guide a robotic system with a plasma arc processing system coupled thereto, according to some embodiments of the present invention.

FIG. 1 shows a block diagram of an exemplary path planning system 102 in a manufacturing facility 100 for generating and simulating a processing path to guide a robotic system 104 with a plasma arc processing system 106 coupled thereto, according to some embodiments of the present invention. As shown, the manufacturing facility 100 includes a user interface 110 comprising a computer keyboard, mouse, a graphical user interface (e.g., a computerized display), other haptic interfaces, voice input, or other input/output channels for a user to communicate with the path planning system 102. In some embodiments, the graphical user interface of the user interface 110 is configured to visualize in a three-dimensional virtual environment motions calculated by the system 102 for a robotic arm of the robotic system 104 to complete processing of one or more desired parts from the workpiece. In some embodiments, the path planning system 102 is in electrical communication with the robotic system 104 and the plasma arc processing system 106 to automate or otherwise direct the respective systems to configure themselves using the recommended components and settings and follow the calculated motions for processing (e.g., cutting) the workpiece. For example, the robotic system 104 can include at least one robotic arm for holding and manipulating a processing torch (e.g., a plasma arc torch) of the plasma arc processing system 106 to process (e.g., cut) the workpiece in a processing path determined by the path planning system 102. In some embodiments, the robotic system 104 includes at least two robotic arms, one for holding the workpiece and the other for holding the processing torch. In this configuration, the processing path generated by the path planning system 102 can include motion plans for one or both robotic arms for manipulating the workpiece and/or the torch to form the desired parts.

As shown in FIG. 1, the path planning system 102 generally includes an input processing module 112, a computation module 114, a display module 116 and an optional actuation module 118. The modules 112-118 can be implemented in hardware only or in a combination of hardware and software to execute the path determination and simulation methods described below. In particular, the input processing module 112 is configured to receive and process data from a user via the user interface 110. Such data, which is described in detail below, can be in the form of any suitable data structures, such as textual lists, XML documents, class objects (e.g., instances of C++ or Java classes), other data structures, or any combination thereof. The computation module 114 is configured to determine a processing path for forming one or more desired parts on a workpiece by a torch of the plasma arc processing system 106 mounted on a robotic arm of the robotic system 104. The processing path includes one or more of recommended motions for at least one robotic arm of the robotic system 104 as well as a recommended selection of one or more consumables for configuring the plasma arc processing system 106, the details of which are provided below. The display module 116 is configured to interact with the graphical user interface 110 to visualize the recommended motions of the robotic arm (as calculated by the computation module 114) in a virtual simulation. More specifically, the display module 116 can visually illustrate how the torch mounted on the robotic arm processes a workpiece while complying with the recommended sequence of motions, part selections, parameters and other constraints. Such a display encourages user interaction with the path planning system 102 to change and/or refine the parameters for motion planning. The optional actuation module 118 can (i) instruct the plasma arc processing system 106 to be configured with the recommended consumables determined by the computation module 114 and/or (ii) actuate the robotic system 104 to follow a sequence of motion captured in the processing path calculated by the computation module 114, with the goal of completing the user-desired processing task. In general, the optional actuation module 118 can communicate with any one of the modules 112-116 to obtain the pertinent information for automatically actuating the robotic arm of the robotic system 104 and/or configuring the plasma arc processing system 106.

The system 100 further includes a memory 160 that is configured to communicate with one or more of the modules 112-118 of the path planning system 102. For example, the memory 160 can be used to store data processed by the input processing module 112, one or more functions and values used by the computation module 114 to determine the processing path, and/or instructions formulated by the optional actuation module 118 to direct the movement of the robotic system 104 and/or consumable setup for the plasma arc processing system 106. In some embodiments, the memory 160 can store at least a portion of a library of cut charts 162 accessible by the path planning system 102. Details regarding the library of cut charts 162 are described below in detail.

In some embodiments, the path planning system 102 is a stand-alone system that is separate from the robotic system 104 and/or the plasma arc processing system 106. For example, the path planning system 102 can be a vendor-side component configured to transmit instructions to the client system to control the movement of the robotic arm of the client system and/or configuration the plasma arc torch of the client system. Even though the actuation module 118 is illustrated as a part of the path planning system 102, in some embodiments, it is absent from the path planning system 102 and/or remote from the path planning system 102, such as on the client system. In some embodiments, the path planning system 102 is capable of performing remote and/or non-real-time path planning. In some embodiments, the path planning system 102 is configured to perform path planning using a known model number of a robotic system and/or a known model number of a plasma arc processing system, without the need to communicate with either or both of the actual systems.

Even though the present invention describes generating and simulating a processing path for controlling a robotic arm having a plasma processing tool mounted thereto, a person of ordinary skill in the art can appreciate that the systems and methods of the present invention are easily adaptable to any processing tool mounted to the robotic system 104 to perform any type of processing tasks relative to a given workpiece. An exemplary processing tool can be a plasma arc, waterjet or laser processing tool. An exemplary processing task can be a cutting, marking or gouging operation.

Figure 2:
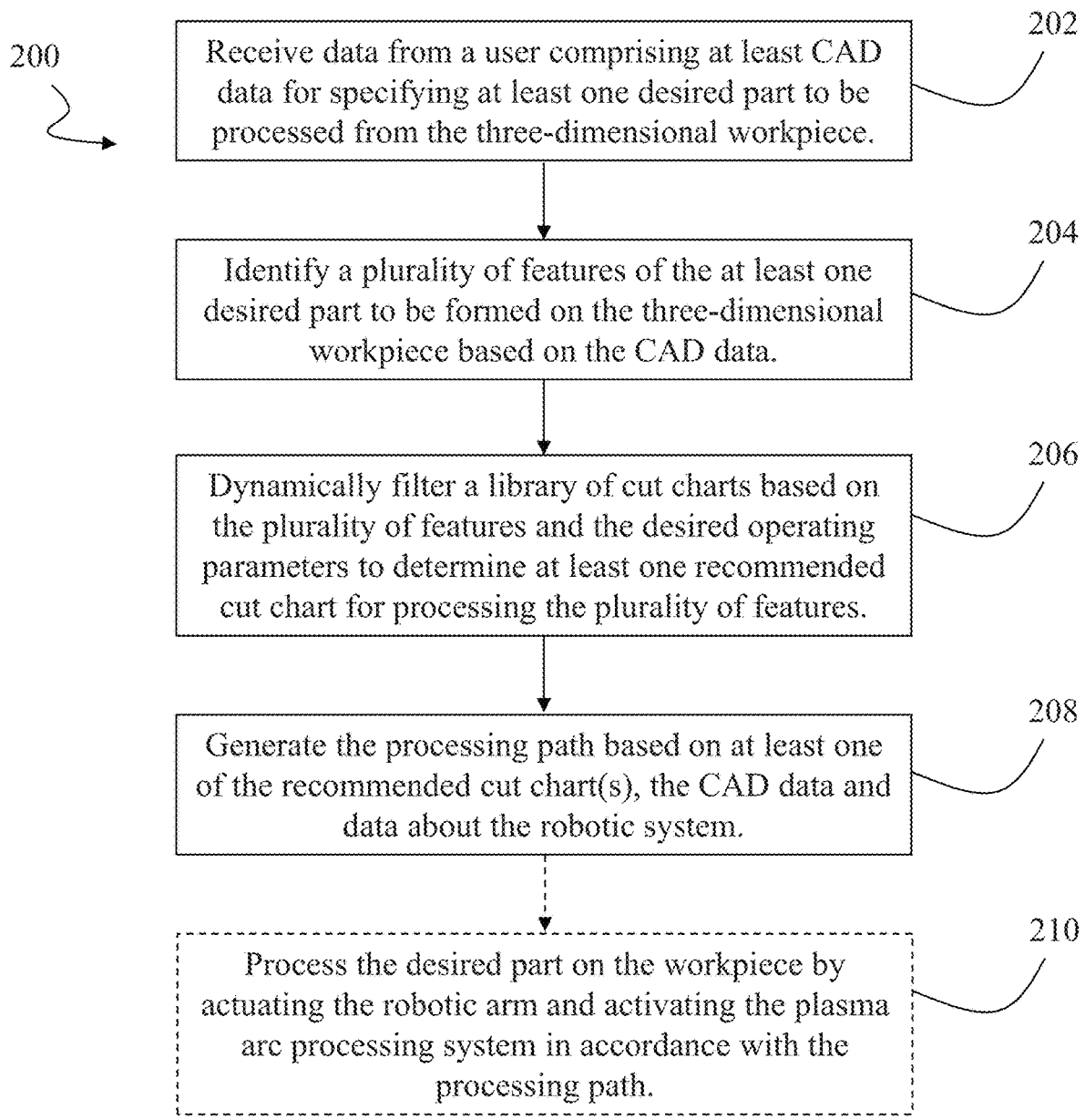
FIG. 2 shows an exemplary method implemented by the path planning system of FIG. 1 to generate and simulate a processing path, according to some embodiments of the present invention.

FIG. 2 shows an exemplary method 200 implemented by the path planning system 102 of FIG. 1 to generate and simulate a processing path, according to some embodiments of the present invention. As shown, planning a processing path involves the input processing module 112 of the path planning system 102 receiving and processing the data needed to determine the processing path (step 202), where at least a portion of the data is received from a user via the user interface 110. The input data received from a user can include Computer-Aided Design (CAD) data for specifying at least one desired part to be processed from a three-dimensional workpiece. For example, the CAD data can comprise three-dimensional data for visualizing the workpiece and the desired part(s) to be processed (e.g. cut) from the workpiece, such as workpiece dimension data, desired part dimension and location data, and/or a reconstituted model of the workpiece (e.g., representative of the blank workpiece before processing). In some embodiments, the path planning system 102 is in electrical communication with the robotic system 104 to obtain pertinent data for controlling and manipulating the robotic arm of the robotic system 104. For example, the pertinent robotic data can be the identification of the robot type to be used for the processing task (e.g., ABB IRB2400). In some embodiments, the path planning system 102 is in electrical communication with the plasma arc processing system 106 to obtain pertinent information about the system 106, such as the identification of the type of the plasma arc processing system 106 to be used for the processing task (e.g., Hypertherm XPR 300). In some embodiments, the path planning system 102 is in electrical communication with the cut chart library 162 in the memory 160 that stores one or more cut charts for one or more different plasma arc processing systems. In general, the library of cut charts 162 provide different combinations of operating parameters for different processing types corresponding to different sets of consumables. More specifically, each cut chart can provide recommended settings for a suite of one or more parameters to perform a given operation (e.g., cut a hole) relative to a workpiece of a given type with a given set of consumables and other hardware requirements. Exemplary parameters considered by a cut chart can include at least one of a current, cut speed, work piece material type and/or workpiece material thickness. As an example, if a plasma arc torch is configured with a set of cutting consumables that can operate at 80 amps and an operator would like to use this torch to cut through a workpiece of ½-inch mild steel, the operator would reference a 80A ½" Mild Steel cut chart that specifies a host of parameters to perform the cut, such as how long to pierce for, what the standoff distance should be, how long the pierce delay is, how fast the torch can move to perform the cut following the pierce, and how to extinguish the arc at the conclusion of the cut. Thus a cut chart represents a recipe for producing a given processing result with the given ingredients. In some embodiments, the data related to the robotic system 104, the data related to the plasma arc processing system 106 and/or the library of cut charts can be supplied and/or selected by the user via the user interface 110.

After processing the relevant data by the input processing module 112, the computation module 114 of the path planning system 102 is configured to identify one or more features of each desired part to be formed on the three-dimensional workpiece based on the CAD data supplied by the user (step 204). Exemplary features include open cuts, holes, slots, edge beveling, marking, gouging, etc. In some embodiments, the computation module 114 is configured to extract the geometry of the workpiece from the CAD data, as well as identify other workpiece information such as material type and thickness of the workpiece. In some embodiments, extraction of the geometry of the workpiece via computation model 114 includes reverse engineering/simulating the original workpiece blank from the part file (e.g., via filling in holes, developing hole surfaces, filling in gouges, etc.). In some embodiments, computation model 114 reconstructs the missing support surfaces (e.g., the material cut out/removed to create the desired holes in the finished part) by using a combination of "untrim" and "extend" features of a CAD engine on the surfaces of the selected feature. In some embodiments, the computation module 114 re-projects the lead in/out path position on this reconstructed surface by using the "re-project" of a CAM engine, then normalizes the torch direction at the desired/determined pierce points by using the "normalize" of the CAM engine, and then optionally gives user control over orientation transition from the normal pierce to the cut (maybe beveled) by a set of new user input fields (fanning distance) and by using the "vector interpolation" of the CAM engine. In some embodiments, the computation module 114 de-features (e.g., removes features such as holes, slots, etc.) to close opening(s) and/or can add geometr(ies) to replicate feature(s). In some embodiments, the computation module 114 de-features and/or closes the openings (e.g., the opening of the surfaces to the selected feature to cut) in 3D models to close internal/external features and provide an accurate and consistent work surface.

In some embodiments, as the end-user programs a feature relative to a workpiece (e.g., a hole on a tube), the path planning system 102 helps the user by building a phantom support geometry with the pertinent parameters (e.g., initial height sensing (IHS), lead in lead out, radial transition to the cut features, etc.) displayed graphically to the end-user. In this way the end-user can virtually interact with the full workpiece and add/prioritize his/her need. In some embodiments, the computation module 114 processes the parameters required to build the phantom geometry in the context of a specific process (e.g., plasma cutting, waterjet, etc.). The resulting phantom geometries created may or may not look like the "stock," but can include/consider features and settings essential to the end-user in order to express what he/she needs. In some embodiments, creation and/or augmentation of phantom geometries can be done on-the-fly, such as the phantom geometries are being built while the end-user is programming the hole(s).

Next, the computation module 114 is configured to dynamically filter the library of cut charts 162 based on a number of factors to determine one or more suitable cut charts for the plasma arc processing system 106, each selected cut chart comprising a set of process settings and/or consumable recommendations for configuring the plasma arc cutting system 106 (step 206). The filters applied to the library of cut charts 162 generally include the features and other workpiece information identified from step 204, the data obtained about the plasma arc processing system 106 from step 202, and successive computer-guided inputs from the user to intelligently drill down on the cut chart library 162. The outcome of this filtering step 308 represents an optimized solution that balances user desires with system constraints.

Figure 3:
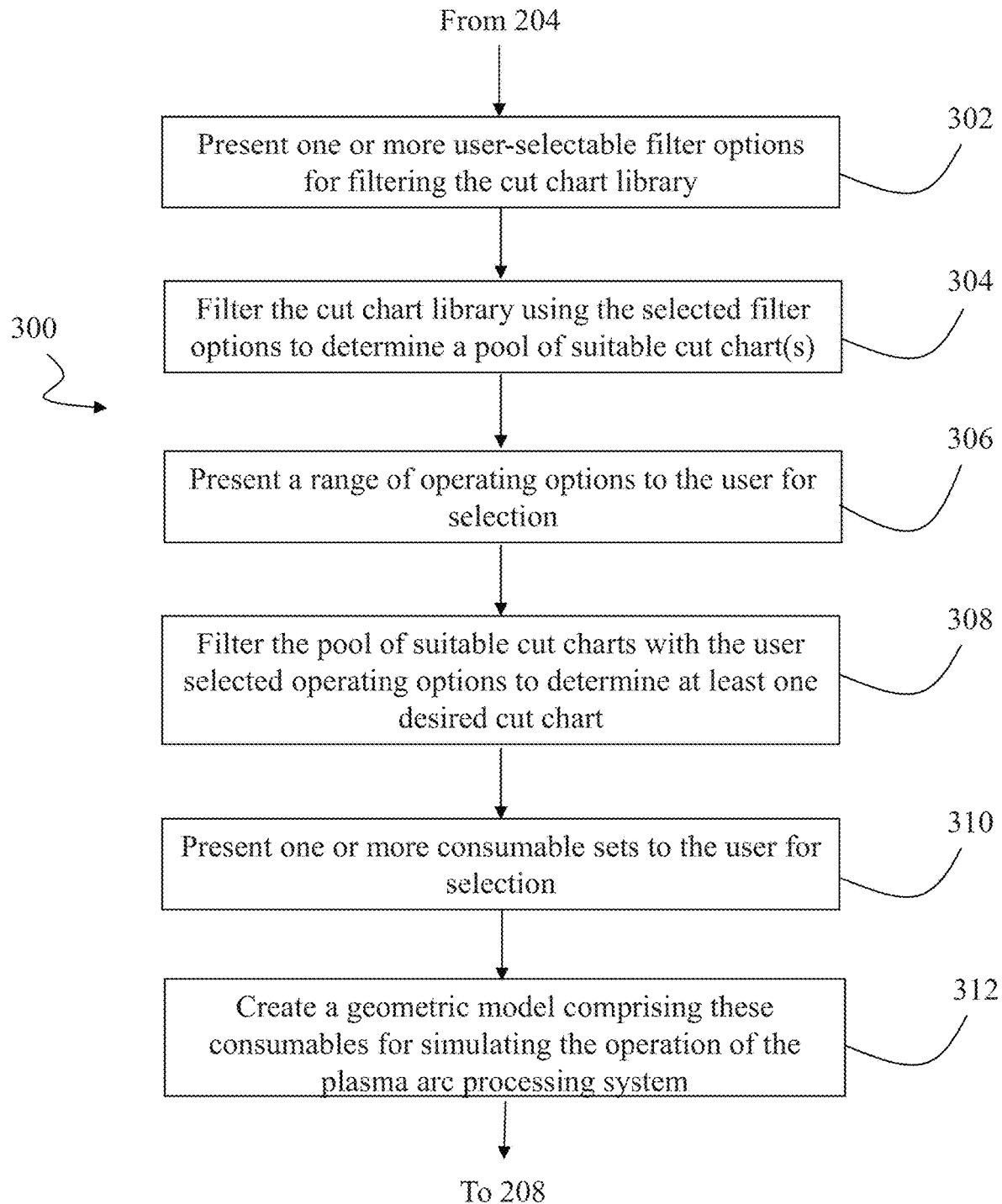
FIG. 3 shows an exemplary implementation of the dynamically filtering step of the method of FIG. 2 to determine consumable component and operating parameter recommendations, according to some embodiments of the present invention.

FIG. 3 shows an exemplary implementation of the dynamically filtering step 206 of the method 200 of FIG. 2 to determine consumable component and operating parameter recommendations, according to some embodiments of the present invention. The method 300 starts with the computation module 114 presenting to a user one or more initial user-selectable filter options for filtering the cut chart library 162 (step 302). Exemplary initial filter options include a processing system filter for allowing the user to identify the plasma arc processing system 106 to be used for the desired processing operations and one or more workpiece filters for allowing the user to specify pertinent workpiece properties, such as thickness and material type. Other initial filter options that can be offered to a user for selection include one or more of operating parameter value ranges (e.g., current ranges), cost ranges, consumable availability ranges, outcome value priority ranges (e.g., quality, cost, speed, etc.), and/or consumable quality ranges. For example, the user can choose to filter the cut chart library 162 to locate one or more cut charts that support a desired operating current, with the understanding that a higher operating current tends to produce faster cuts, but at the expense of lower consumable life. Additional filter options that can be offered to a user for selection include optimized cut quality, minimized power consumption, optimized cut speed, etc. In some embodiments, the initial filter options are customizable and user configurable. In general, each filter option can be user selectable from a drop-down menu that provides a pool of different options in the same category for user consideration.

Next, the computation module 114 is configured to filter the library of cut charts 162 with the user-selected filter options (step 304). The results of the filtering can comprise determination of a pool of one or more suitable cut charts from the library of cut charts 162 that satisfy the initial filter options (e.g., cut charts that accompany the identified plasma arc processing system 106 and correspond to the identified workpiece thickness and material type). The computation module 114 is then configured to present a range of operating options to the user for selection based on the pool of suitable cut charts (step 306), where the set of operating options correspond to and are constrained by the operating parameters offered by the set of identified cut charts from the filtering step 302. In some embodiments, the operating options comprise actual cut chart(s) selectable by a user, where each cut chart encapsulates a set of operating parameters corresponding to a consumable set for making a particular cut. In some embodiments, if the computing module 114 cannot determine from the library of cut charts 162 at least one cut chart that satisfies the user-selected filter options, the computing module 114 is adapted to offer a secondary recommendation of one or more cut charts for consideration by the user. In return, the user chooses one or more of the operating options presented in accordance his/her processing needs and desired outcome. The computation module 114 can employ the user selection to successively filter the pool of suitable cut charts to determine at least one cut chart that is desired by the user (step 308). For example, the computation module 114 can allow the user to directly select one or more desired cut chart(s) from the pool of suitable cut charts. Alternatively, the computation module 114 can allow the user to filter the pool of suitable cut charts by one or more desired operating parameters, such as speed, current, etc.

Furthermore, based on the user-selected cut chart(s), the computation module 114 can determine and present for user selection one or more suitable consumable sets for configuring a torch tip of the plasma arc processing system 106 that support the operating parameters identified in the user-selected cut chart(s) (step 310). These consumable set options can be determined from the user-selected cut charts, where each cut chart identifies at least one consumable set with which it is compatible. In some embodiments, these suitable consumable set options are constrained by real-life availability of the consumables (e.g., what is available on site in real time or are already installed on plasma system 106). For example, the computation module 114 can be in electrical communication with an inventory of available components to determine consumable availability and only offer for user selection those consumable sets that are currently available, which can be used by the computation module 114 to narrow cut chart selection/searches relatives to the cut chart library 162. In response, the user can choose a desired consumable set for simulating the plasma arc processing system 106.

Based on the desired consumable set and operating parameters captured by the selected cut chart(s), the computation module 114 is adapted to create a geometric model for simulating operations of the plasma arc torch of the plasma arc processing system 106, such as in a 2D environment (step 312). This torch geometric model in turn affects the subsequent determination of the processing path in 3D as explained below with reference to FIG. 2.

In general, the successive filtering method 300 of FIG. 3 can intelligently guide the user towards the selection of one or several cut charts capturing optimized operating parameters and consumable components for configuring the plasma arc processing system 106. As explained above, the filter options presented at various successive levels of filtering in the method 300 can be based on a combination of one or more of (i) input data received by the path planning system 102 from the user and/or (ii) predefined data including cut chart data and information about available hardware (e.g., type/setup of the robotic system 104 and the plasma arc processing system 106, the consumables in stock, the consumables installed on the plasma arc processing system 106, hardware options, etc.). Thus, the operating parameters and consumable components selected by the method 300 represent an optimized solution that balances process/hardware needs with user preferences. In some embodiments, steps 302-312 of method 300 can be combined or the order of these steps can be switched while still remaining within the scope of the present invention. In some embodiments, the filter options and the subsequent user selections are presented via a graphical user interface (GUI) launched by the display module 116 in conjunction with the user interface 110 to easily guide the user towards selecting the optimized consumables and their operating parameter settings.

Figure 4:
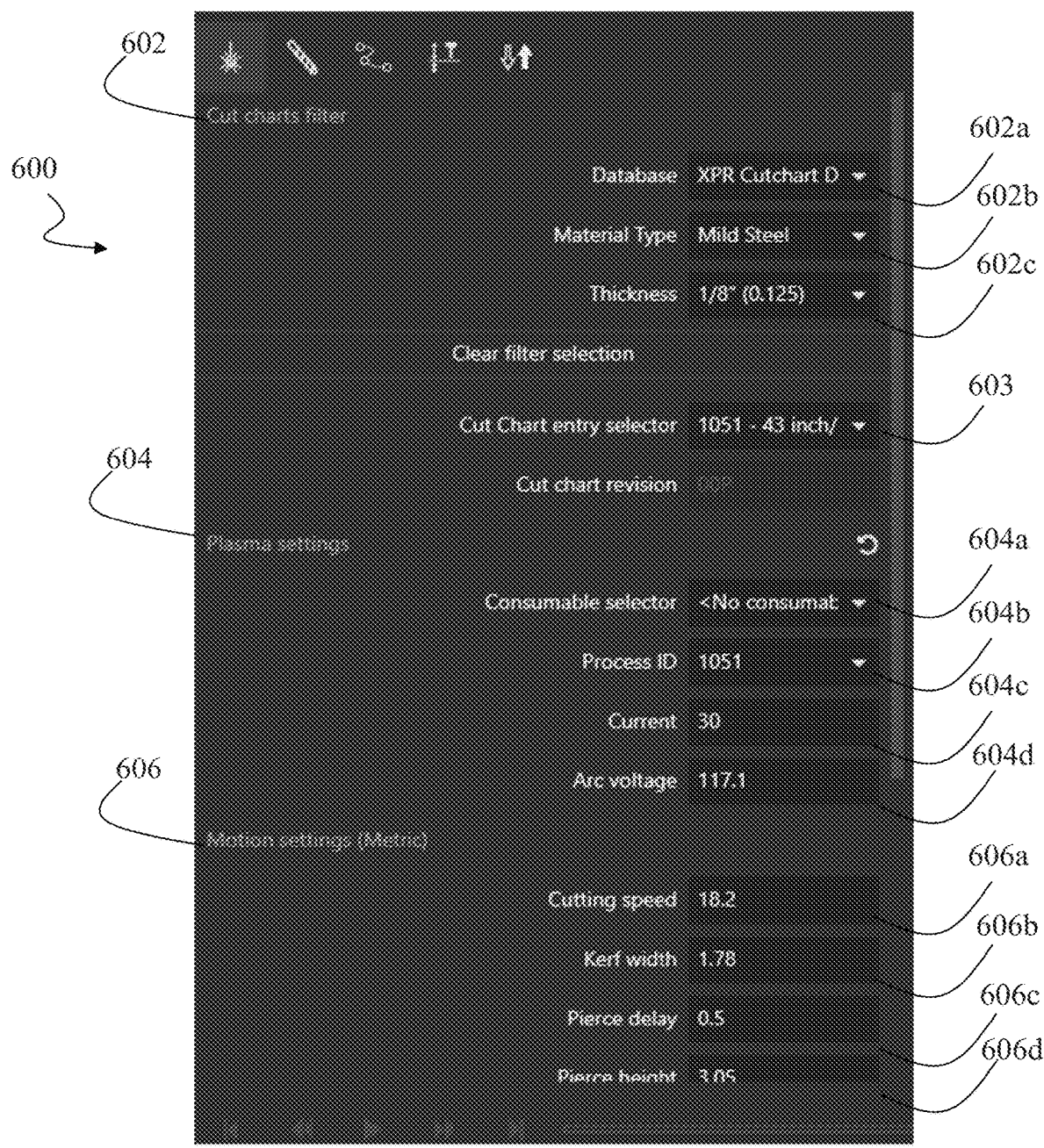
FIG. 4 shows an exemplary graphical user interface for receiving user inputs and displaying consumable component and operating parameter recommendations in connection with the successive filtering method of FIG. 3, according to some embodiments of the present invention.

FIG. 4 shows an exemplary graphical user interface (GUI) 600 for receiving user inputs and displaying consumable component and operating parameter recommendations in connection with the successive filtering method of FIG. 3, according to some embodiments of the present invention. As shown, the GUI 600 presents several types of user-selectable initial filter options 602 (executing step 302 of method 300) that can be used by the computation module 112 to filter the library of cut charts 162. For example, the database filter 602*a* allows the user to select the desired type of plasma arc torch system 106 to be used from a number of available system options (e.g., XPR, Powermax, etc.) Such a selection permits the computation module 112 to load the pertinent cut chart(s) from the library of cut charts 162 corresponding to the selected plasma arc torch system. In addition, the material type filter 702*b* allows the user to select the workpiece material type from a number of workpiece type options (e.g., mild steel, aluminum, stainless steel, etc.), and the thickness filter 702*c* allows the user to select the workpiece thickness from a number of thickness options (e.g., 16 GA, 12 GA, ⅛ inches, 10 GA, etc.). In general, these filter options 602 are customizable and user configurable. In addition to or in place of the filter options 602 shown in FIG. 4, other filter options are available, such as cut speed, consumable quality, cost, etc.

After receiving the user selections of the initial filter options 602, the computation module 112 is configured to automatically determine a pool of one or more suitable cut chart(s) that satisfy the initial filter options (executing step 304 of method 300). The GUI 600 can then present a range of operating options to the user for selection based on the pool of suitable cut charts determined (executing step 306 of method 300). As shown, the cut chart selector filter 603 allows the user to directly select at least one desired cut chart from the pool of suitable cut charts. In alternative embodiments, instead of or in addition to allowing the user to directly select the desired cut chart(s), the GUI 600 can present various operating parameter filter options (e.g., speed, gas type, etc.) for selection by the user to indirectly filter the pool of suitable cut charts. In general, the computation module 114 is adapted to filter the pool of suitable cut charts based on the user selections to determine the desired cut chart (executing step 308 of method 300).

In some embodiments, based on the desired cut charts selected by the user from the cut chart selector filter 603, the GUI 600 is adapted to determine the compatible (and available) consumable sets that can be used to assemble the torch tip of the specified plasma arc processing system 106. In some embodiments, these consumable sets are displayed as user-selectable options under a plasma settings area 604 of the GUI 600. For example, the consumable selector filter 604*a* can present one or more compatible consumable sets for selection by the user to configure the plasma arc processing system 106 (executing step 310 of method 300). In addition, the various operating parameter settings in the desired cut chart selected by the user from the cut chart selector filter 603 can be automatically displayed to the user via the GUI 600. For example, the plasma setting area 604 can automatically populate (i) a process ID field 604*b* to display a process ID extracted from the desired cut chart that specifies a combination of current amperage and gas mixture composition, (ii) a current field 604*c* to display a current setting extracted from the desired cut chart and (iii) an arc voltage field 604*d* to display a voltage setting extracted from the desired cut chart. In general, the fields in the plasma settings area 604 of the GUI 600 can be configured display filter options and setting recommendations for configuring the plasma arc torch system 106.

The GUI 600 can also include a motion settings area 606 configured to automatically display to the user various operating parameters in the desired cut chart selected by the user from the cut chart selector filter 603 that affect subsequent motion planning for the robotic system 104. As shown, the motion settings area 606 can automatically populate a cutting speed field 606a to display a speed setting, a kerf width field 606b to display a kerf width setting, a pierce delay field 606c to display a pierce time delay and a pierce height field 606d to display a pierce height setting, all of which can be extracted from the cut chart selected from the cut chart selector filter 603. In general, the fields in the motion setting area 606 can be configured to display setting recommendations related to motion, geometry and timing for controlling the robotic system 104.

In some embodiments, the GUI 600 additionally includes an option to allow the user to select a marking mode, in which case the plasma arc processing system 106 in conjunction with the robotic system 106 would be used to perform a marking operation (instead of a cutting operation) of the desired part(s) relative to a workpiece. Similar to a cutting operation, the computation module 114 can employ the method 300 of FIG. 3 to guide a user to determine the appropriate cut chart(s), thereby the suitable operating parameters and consumable sets that are optimized to the desired marking operation.

Referring back to FIG. 2, once the suitable consumables and their operating parameters are selected by the computation module 114 for modeling the torch tip of the plasma arc processing system (from step 206), the computation module 114 proceeds to generate a processing path for guiding the robotic arm of the robotic system 104, which is configured to hold/manipulate the torch of the plasma arc cutting system 106 as the torch emits a plasma arc for processing the workpiece (step 208). More specifically, data related to the selected consumables and their operating parameters is automatically transferred to all the subsequent programming stages at step 208 (and optional step 210), including processing path creation, simulation, and process output. These programming stages are adapted to use the selected consumable and operating parameter data when required to complete their programming tasks.

At step 208 of FIG. 2, the computation module 114 generates the processing path based on a combination of (i) the features extracted from the CAD data from step 204, (ii) the torch tip model of the plasma arc processing system 106 generated based on the selected cut chart(s) from step 206, which captures data related to the selected consumables and their operating parameters, and (iii) the input data related to the robotic system 104 from step 202. The resulting processing path comprises a sequence of planned robotic motions for processing (e.g., cutting) the identified features from the three-dimensional workpiece using the operating parameters and consumable components from the torch tip model. Further, the planned robotic motions for actuating the robotic arm can compensate for influences in plasma arc dynamics introduced to the plasma arc from operating the robotic arm in the three-dimensional environment, along with other compensations and adjustments (e.g., for the age of the consumables) as described below.

Figure 5:
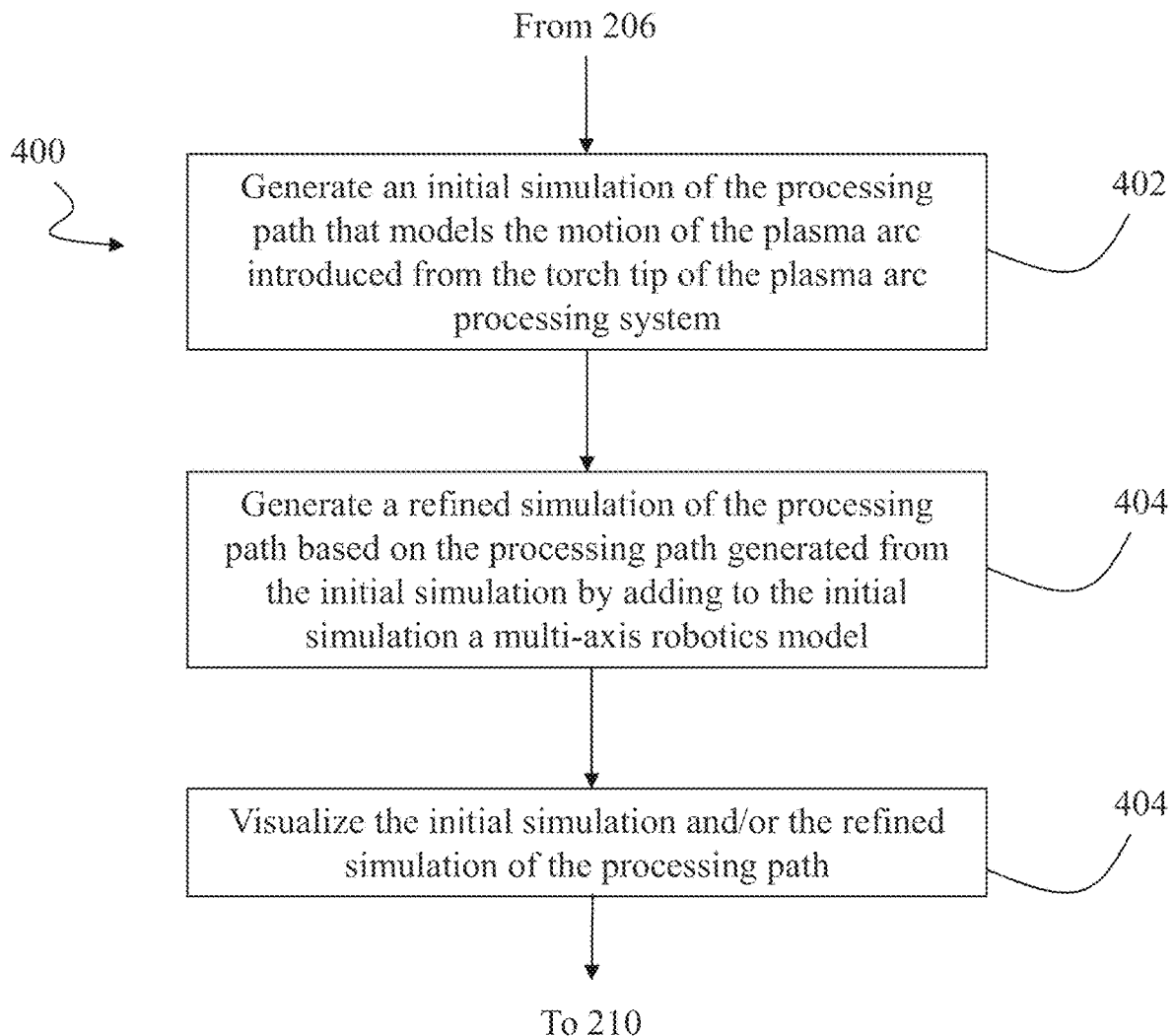
FIG. 5 shows an exemplary implementation of the processing path generation step of the method of FIG. 2, according to some embodiments of the present invention.

FIG. 5 shows an exemplary implementation of the processing path generation step 208 of the method 200 of FIG. 2, according to some embodiments of the present invention. The method for generating the processing path 400 can be broadly decomposed into two steps 402, 404. The first step 402 involves generating an initial simulation of the processing path that models the motion of the plasma arc introduced from the torch tip of the plasma arc processing system 106 to process (e.g., cut) the one or more features (e.g., holes, slots) of a desired part from the workpiece. In some embodiments, this is performed in a two-dimensional environment and in some other embodiments this is performed in a three-dimensional environment. In converting a two-dimensional path plan to a three-dimensional path plan, torch/arc angularity, spacing from workpiece surface, and arc angle relative to cut edge are manipulated to maintain proper spacing for cut quality through surface angular changes. In some embodiments, torch height and orientation relative to the workpiece surface are adjusted throughout the cut so as to maintain a normal angle relative to the instant cut surface and proper spacing from the workpiece. For this initial simulation, the motion plan for the torch tip takes into consideration of the operating parameters and the consumable selections from step 206 of the method 200 of FIG. 2. More specifically, generating the initial simulation can be based on a combination of (i) the features extracted from the CAD data (from step 204) and (ii) the torch tip model of the plasma arc processing system 106 that simulates the torch tip by integrating the recommended consumables with the recommended parameter settings provided by the selected cut chart(s) (from step 206).

In some embodiments, the initial simulation of the processing path is generated for the torch tip of the plasma arc processing system 106 without considering the robotic system 104. In some embodiments, planning the plasma motion during the initial simulation includes ensuring that the plasm arc motion is constant during a cut operation. That is, once the plasma arc is transferred to the workpiece, the arc needs to complete the cut before being extinguished or otherwise withdrawn from the workpiece. In some embodiments, planning the plasma motion during the initial simulation includes adapting the selected cut chart(s), which are configured for two-dimensional surface processing, to process in a three-dimensional environment. For example, adapting the selected cut chart(s) can involve computing the processing path to compensate for the influences in plasma arc dynamics introduced during processing in a three-dimensional environment. An exemplary influence on plasma arc dynamic is motion in X, Y and Z axes of torch angularity relative to the three-dimensional workpiece. Different adjustments can be applied to the processing path depending on if the torch angle relative to the workpiece is, for example, a perpendicular angle or a proper angle. Other influences on plasma arc during processing that are compensated for by the processing path include plasma arc characteristics, such as arc diameter and/or arc physics (e.g., arc shape (e.g., cylinder, cone, etc.), kerf, height, swirl direction, etc.), gravity influence on the plasma arc, spatter and slag flow direction (e.g., back to if the torch/arc is beneath the workpiece or away from if the torch/arc is above the workpiece), etc. Yet, other influences accounted for by the processing path include motion impacts during processing, such as cut direction for a given feature, cut height, kerf, etc. For example, in some embodiments, cut length, area and/or perimeter size are considered by the computation module 112 to adjust the speed of a cut for optimal cutting results. In some embodiments, adaptations for processing features in a three-dimensional environment and dynamic speed adjustment based on the material thickness at a specific point are factored into the path design. Exemplary adjustments include introducing variable speed within a cut, adding an extra tilt angle to path vectors in addition to the CAD nominal bevel angles to account for arc behavior or avoid collisions, specific entry motion due, and/or close loop overlap extension.

In some embodiments, the processing path compensates for the age of at least one consumable component selected to simulate the torch tip of the plasma arc processing system 106. In general, the age of a consumable impacts the performance of the plasma arc processing system 106, as well as the shape and behavior of the plasma arc generated. A given set of consumables wear down over time due to usage, thereby changing their dimensions as they age. For example, a nozzle bore tends to increase in diameter and/or lose its level of cylindricity over time. As the bore diameter increases so does the arc diameter as the plasma arc is not as constricted by the gas flowing through the bore. Similar behavior occurs with a shield bore and the distance from the hafnium to the work piece (as hafnium slowly erodes throughout the usable life of the electrode). The computation module 114 of the path planning system 102 can factor the age of a consumable into path planning consideration to limit these negative effects. Exemplary compensations include, for example, adjusting the offset of the planned path to compensate for the increased arc diameter and/or slowing the cutting speed to compensate for the slightly more dispersed arc created by the larger nozzle diameter. Even though the various compensations introduced to the processing path to account for plasma arc dynamics and consumable age are described in the context of the initial simulation at step 402, these compensations can also be performed during the refined simulation stage at step 404 or across both steps 402, 404.

The second step 404 in generating the processing path involves generating a refined simulation of the processing path generated from the initial simulation of step 402 by adding to the initial simulation a multi-axis robotics model that identifies a sequence of motions for manipulating the robotic arm of the robotic system 104. In some embodiments, the refined simulation is adapted to plan a sequence of motions for manipulating the robotic arm such that it supports the processing path from the initial simulation (i.e., the sequence of motion for the plasma arc) generated from step 402 while the robotic arm holds the torch of the plasma arc torch system 106. The processing path generated from the refined simulation can be configured to control the robotic arm along at least 5 axes of motion relative to the workpiece that is defined by 3 axes (e.g., X, Y and Z axes). The 5 axes of motion for controlling the robotic arm can include two axes of orientation (e.g., Euler angle Rx and Ry) and three positional axes (e.g., X, Y and Z axes). In some embodiments, the robotic arm can be controlled along an additional sixth redundant axis orientation to offer more flexibility on machine pose to, for example, avoid collision. Further, one or more additional redundant axes can be used, such as rail and rotary axes, to extend the workspace and/or change part orientation with respect to gravity.

More specifically, the sequence of motions of the robotic arm can be simulated by taking into account the initial simulation of the processing path (from step 402), the input data received for controlling the robotic arm (from step 202) and the torch tip model (from step 206). In some embodiments, the input data for controlling the robotic arm comprises at least one of joint limitations, reach limitations, acceleration limitations or speed limitations of the robotic arm. In some embodiments, this sequence of motions for the robotic arm is computed to determine impact locations while adjusting for tip geometries and/or to avoid any potential hardware collision and out-of-reach joints. In some embodiments, the processing path (i.e., the sequence of motions for the robotic arm) generated by the refined simulation of the second step 404 adapts/adjusts the processing path (i.e., the sequence of motion for guiding the plasma arc without considering the robotic arm) generated by the initial simulation of the first step 402 to accommodate various characteristics and limitations of the robotic system 104, such as to avoid any potential collisions and robotic arm limitations. Exemplary robotic collision avoidance systems and methods are described in U.S. Pat. No. 10,754,337, which is owned by the assignee of the instant application and is incorporated by reference herein in its entirety. In some embodiments, a change to the processing path in the initial simulation at step 402 affects the processing path planning in the refined simulation at step 404, such as capping maximum speed and/or capping minimum arc size in the refined simulation. Furthermore, any adjustments/compensations (e.g., consumable age adjustment) performed during the initial simulation is adapted to affect one or more robotic commands in the refined simulation (e.g., delayed plasma turn off, longer/ short wait command, etc.).

Thus, the processing path produced from the refined simulation at step 404 represents a full motion model integrating robotic movement, plasma arc dynamics and torch tip geometry for processing one or more desired parts from a three-dimensional workpiece. In some embodiments, the processing path can encapsulate a variety of data, including features to be cut from the workpiece, the optimal direction for plasma cutting, and process specific information for optimized cuts with the robotic arm (i.e., a multi-axis device). For example, the processing path from the refined simulation at step 404 can simulate the motion of initial height sensing (IHS) for kinematic checking (e.g., local touch on first point of a cut prior to turning on the torch to more accurately measure and adjust the height when starting a plasma arc), simulate a cut for collision checking, pass any time delay information so a WAIT command can be triggered in the robot code in a given feature/routine/ operation, and/or determine a specific point to flag at the beginning of a cut so an ON command can be triggered in the robot code, all of which are automatically completed without needing further interaction/direction from the user.

Figure 6A:
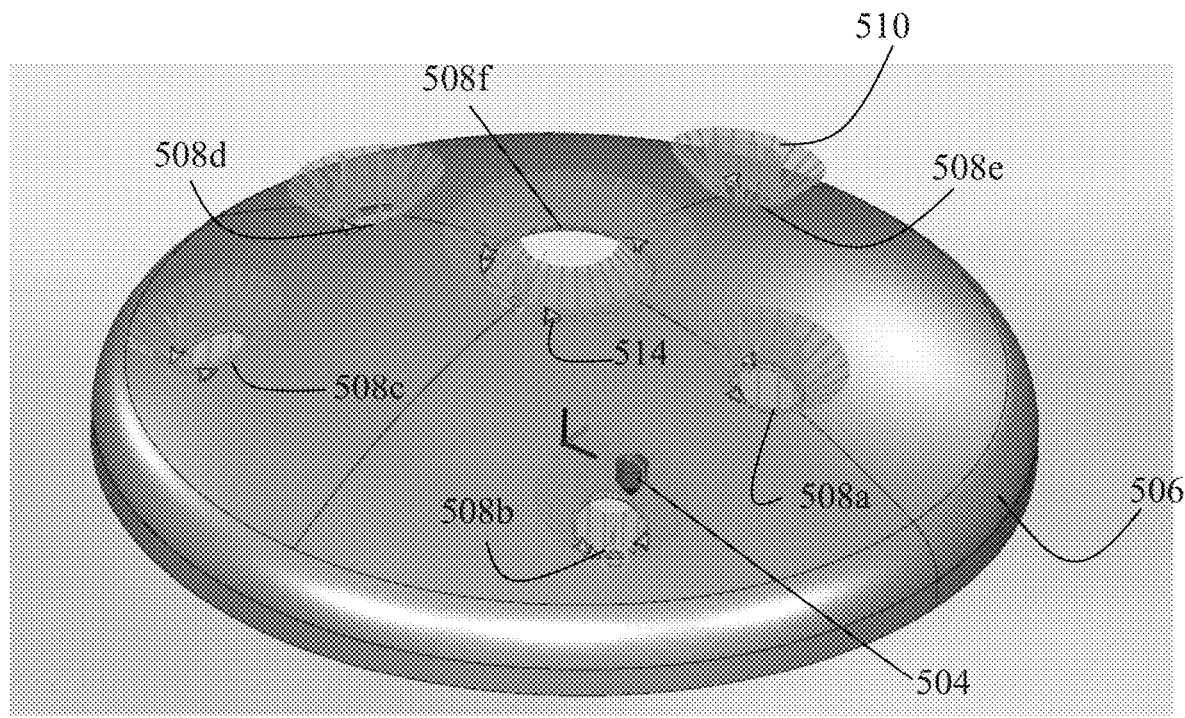
FIGS. 6a-6f show an exemplary initial simulation of a cutting process by the plasma arc processing system of FIG. 1 to cut multiple user-specified features from a workpiece, according to some embodiments of the present invention.
Figure 6B:
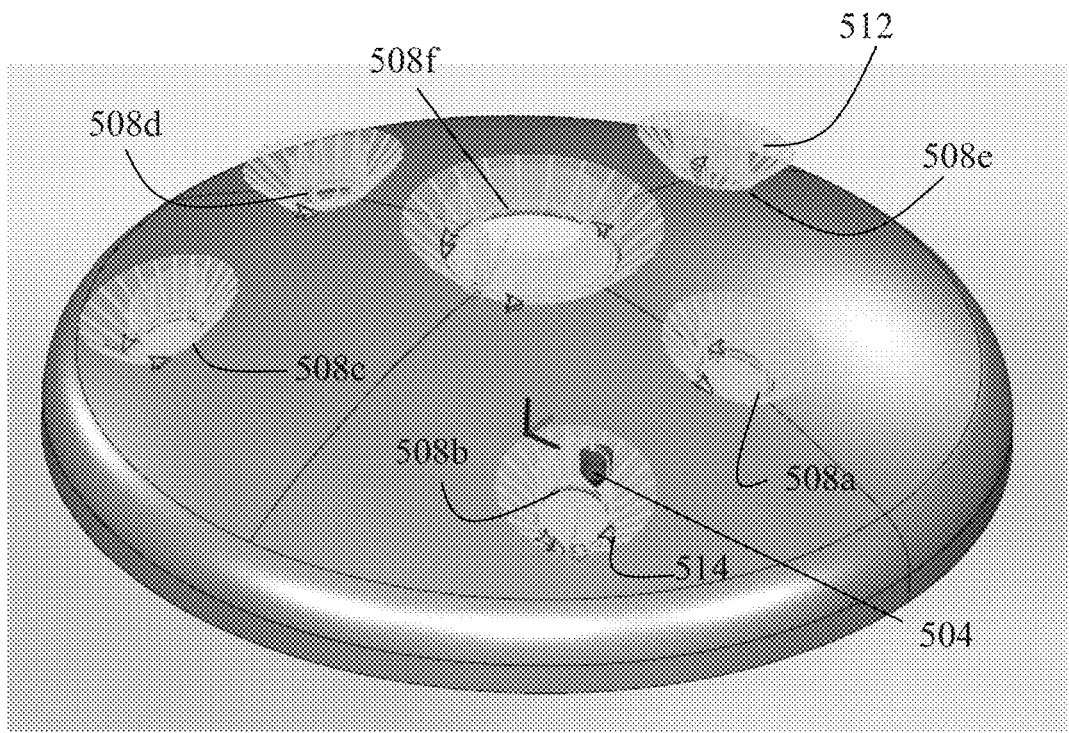
Figure 6C:
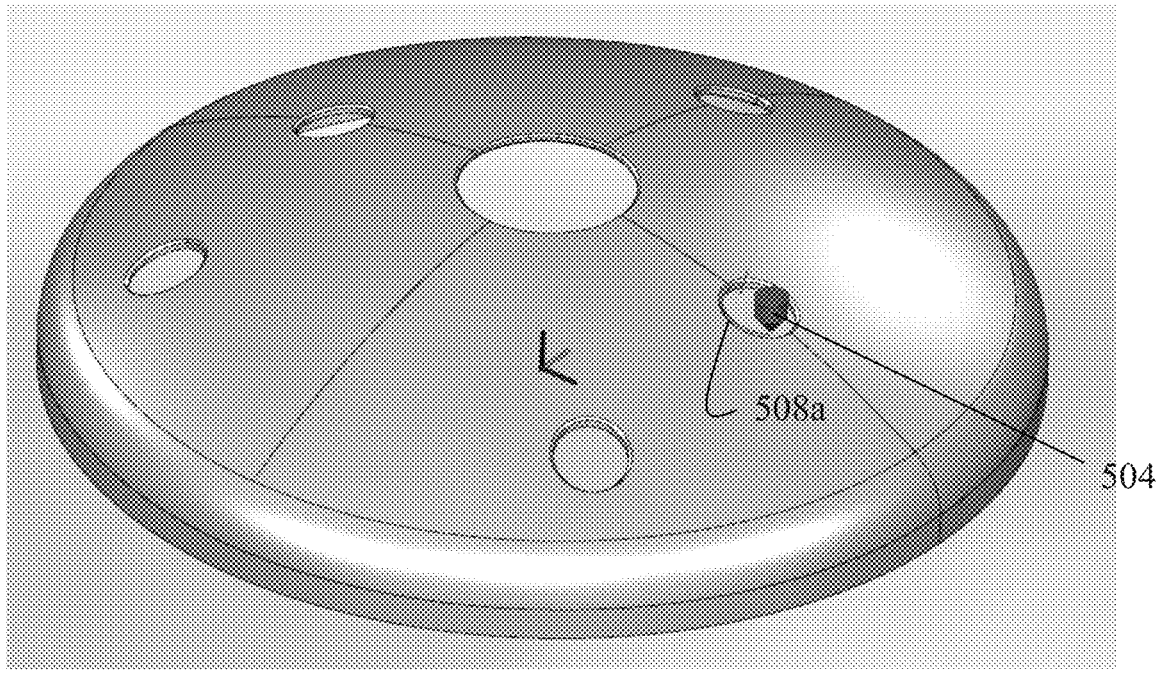
Figure 6D:
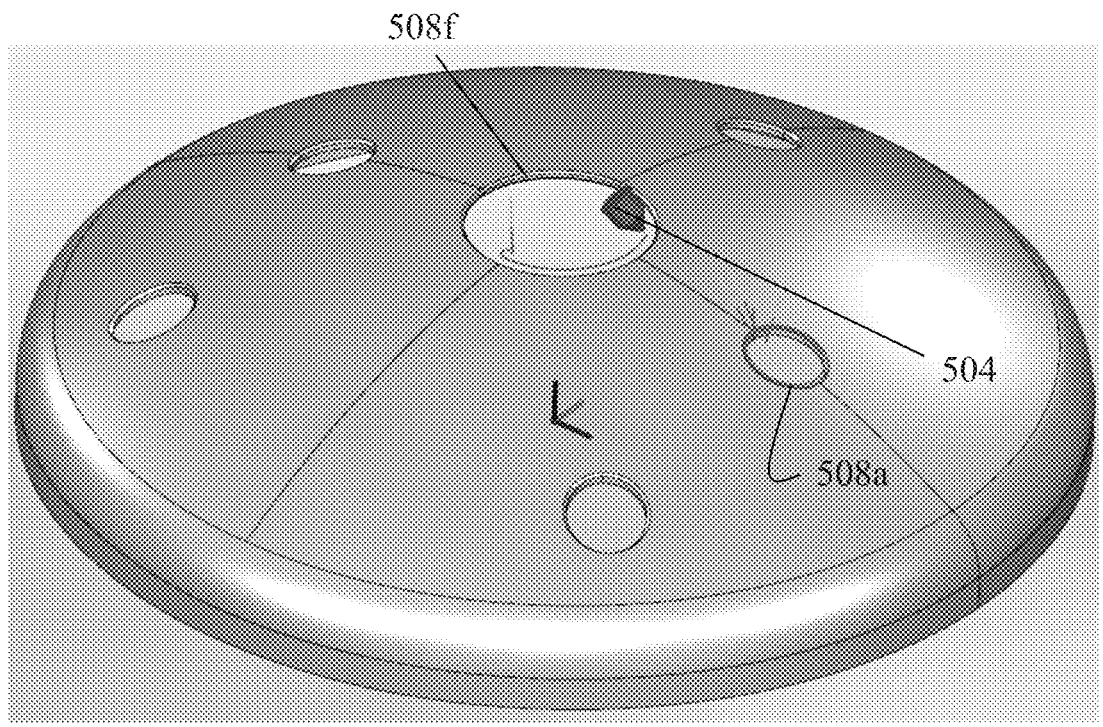
Figure 6E:
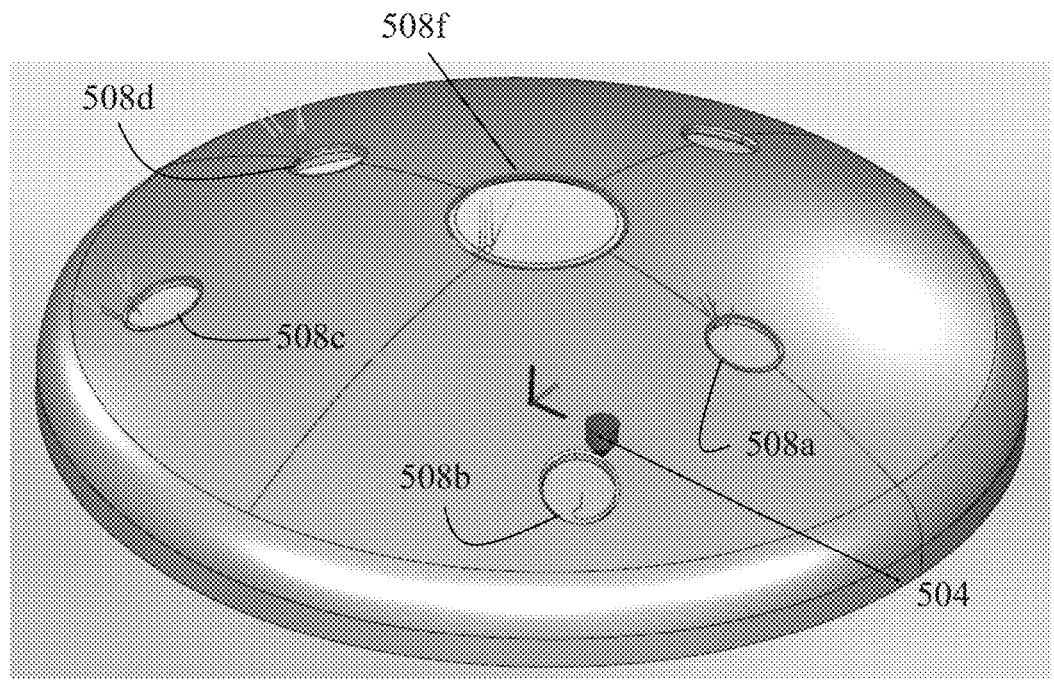
Figure 6F:
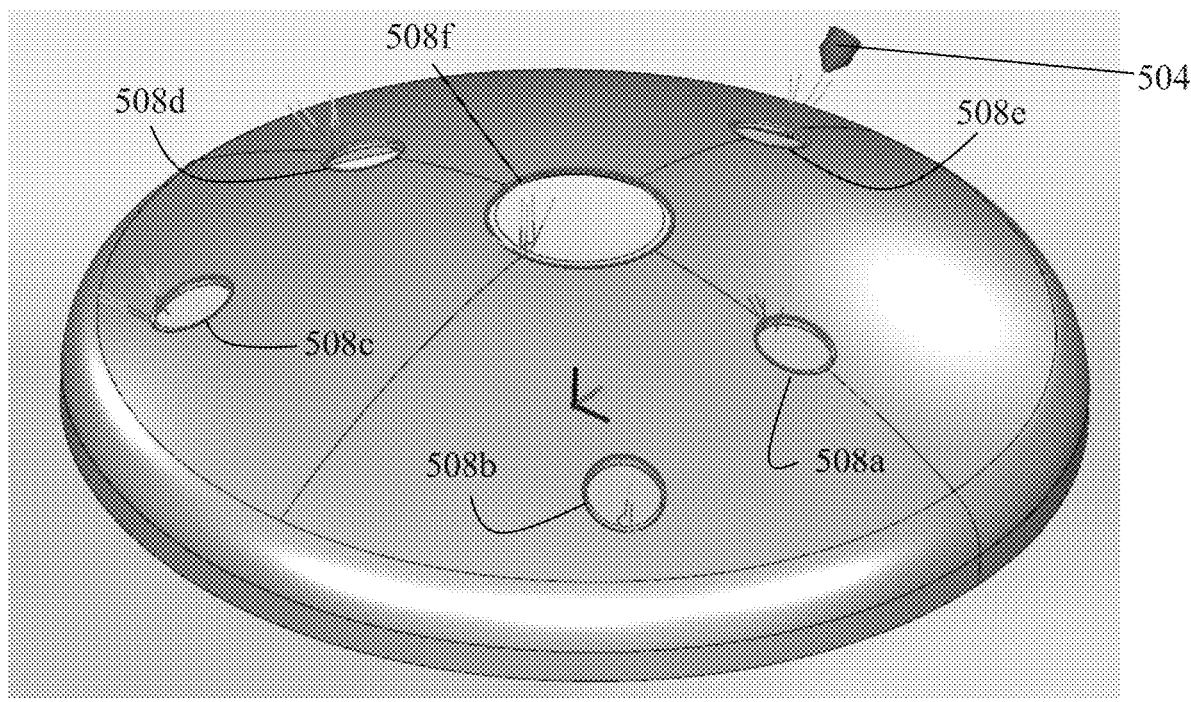

In some embodiments, the processing path plan generated at the initial simulation step 402 and/or the refined simulation step 404 can be visualized via a graphical user interface (GUI) launched by the display module 116 in conjunction with the user interface 110 (step 406). FIGS. 6a-6f show an exemplary initial simulation of a cutting process by the plasma arc processing system 106 of FIG. 1 to cut multiple user-specified features from a workpiece, according to some embodiments of the present invention. This initial simulation can be generated at step 502 of the method 500 of FIG. 5 without modeling the robotic system 104. In general, FIGS. 6a-6f illustrate a three-dimensional workpiece part 506 with multiple features (i.e., holes 508a-f) to be cut from the workpiece 506. Detection of these holes 508a-f relative to the workpiece 506 along with the data used to simulate the holes 508a-f and the workpiece 506 can be extracted from the CAD inputs as described above. More specifically, FIGS. 6a and 6b show the overall required processes and planned paths to cut the holes 508a-f from the workpiece 506. Six different cuts are suggested to cut the six holes 508a-f from the workpiece 506. Each cut/hole is associate with two different cut paths comprising a central cylindrical cut path (represented by trajectory lines 510 shown in FIG. 6a) to cut the hole, and then a second angled cut path (represented by trajectory lines 512 shown in FIG. 6b) to develop a top beveled edge of each hole. These trajectory lines 510, 512 represent a 5-axis trajectory including orientation vectors. In some embodiments, a series of arrows 514 are used in the simulation to model motion/direction of a plasma arc torch 504 of the plasma arc processing system 106 configured to cut these features, where these motion/direction considerations are designated to compensate for system limitations and plasma arc dynamics as discussed above. FIGS. 6c-6f show a simulated sequence of motions for the plasma arc torch 504 of the plasma arc processing system 106 following the cut paths from FIGS. 6a and 6b to cut the holes 508a-f from the workpiece 506. As shown, hole 508a is first cut in a counter-clock wise direction by the torch 504 (FIG. 6c), followed by hole 508f in a counter clock-wise direction (FIG. 6d), followed by holes 508c, 508d and 508b (FIG. 6e) with hole 608e being the last to be cut (FIG. 6f), where these cut directions are determined to compensate for swirl flow influences on the plasma arc on the cut edge. In some embodiments, this simulated sequence of motion is only performed by the torch 504 without the robotic system 104 being considered or modeled. In some embodiments, the torch tip of the plasma arc torch 504 is simulated using a set of optimized consumables configured at a set of optimized operating values determined from the successive filtering method 300 of FIG. 3. In some embodiments, even though FIGS. 6a-f represent the outcome of the initial simulation of the cut paths for forming the holes 508a-f from the workpiece 506, this stage can already automatically perform a number of checks to detect collisions and checks regarding cut order.

Figure 7:
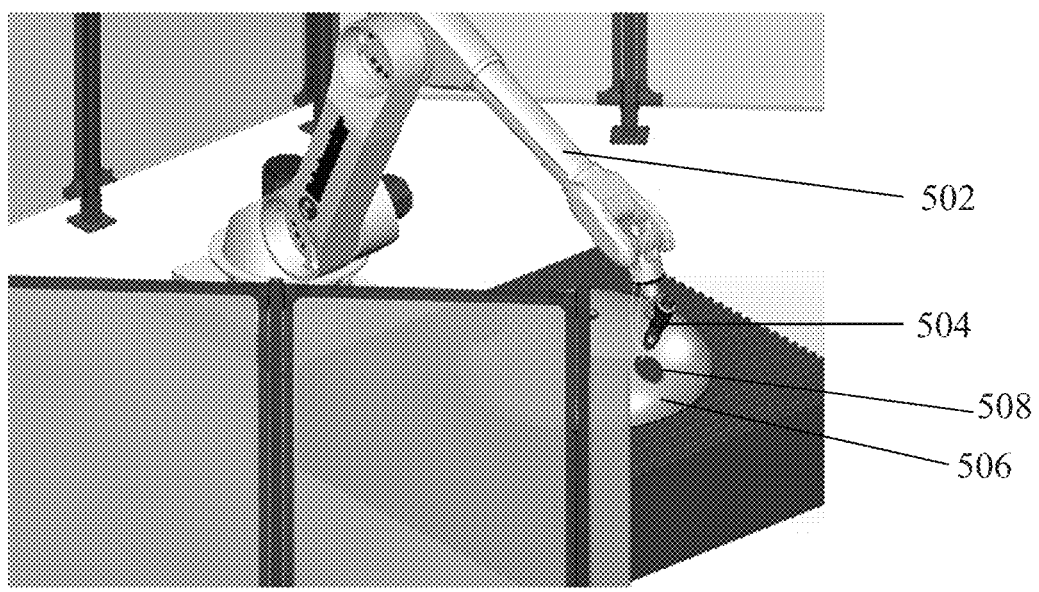
FIG. 7 shows an exemplary refined simulation of the cutting operations of FIGS. 6a-f by incorporating robotic modeling with plasma arc modeling, according to some embodiments of the present invention.

FIG. 7 shows an exemplary refined simulation of the cutting operations of FIGS. 6a-f by incorporating robotic modeling with plasma arc modeling, according to some embodiments of the present invention. This refined simulation can be generated at step 504 of the method 500 of FIG. 5. As shown, a robotic arm 502 of the robotic system 104, which holds the plasma arc torch 504 of the plasma arc processing system 106, is adapted to follow a series of processing paths relative to the three-dimensional workpiece 506 to cut the desired features (i.e., holes) 508a-f from the workpiece 506. The processing paths can be refined from the paths illustrated in FIG. 6-f that are generated from an initial simulation of the paths. In some embodiments, the refined processing path plan of FIG. 7, which provides a sequence of motions for guiding the robotic arm 502 of the robotic system 104, is accompanied by the customized torch consumables and operating parameters associated with the initial processing path plan of FIGS. 6a-f.

Referring back to FIG. 2, in some embodiments, based on the planned processing path generated and visualized at step 208 of method 200, the user can adjust the planned processing path by repeating steps 204-208 of method 200 to change various input data and/or filter options for altering the path. For example, the method 200 can automatically update the processing path by taking into account of any new process data when designing/redesigning the path plan, which can in turn cause the simulation and/or the process outputs for controlling the hardware systems to be automatically updated. In some embodiments, any portion of the data generated by the path planning system 102 can be reset to its default value by the user activating a reset (or refresh) option.

In some embodiments, if the user is satisfied with the simulated processing path, the user can optionally direct the path planning system 102 to process (e.g., cut) the desired part on the workpiece (optional step 210). This can be accomplished by the actuation module 118 of the path planning system 102 interacting with the robotic system 104 and the plasma arc processing system 106, such as transmitting the customized process outputs to these systems 104, 106 for configuring/controlling the plasma arc torch and the robotic arm in accordance with the processing path plan.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A computer-implemented method of planning a processing path relative to a three-dimensional workpiece for a plasma arc cutting system coupled to a robotic arm, the method comprising:
   receiving, by a computing device, input data from a user comprising (i) Computer-Aided Design (CAD) data for specifying at least one desired part to be processed from the three-dimensional workpiece, and (ii) one or more desired parameters for operating the plasma arc cutting system;
   identifying, by the computing device, a plurality of features of the at least one desired part to be formed on the three-dimensional workpiece based on the CAD data;
   dynamically filtering, by the computing device, a library of cut charts based on the plurality of features and the desired operating parameters to determine at least one recommended cut chart for processing the plurality of features, wherein the recommended cut chart comprises a set of recommended process settings for the plasma arc cutting system;
   generating, by the computing device, the processing path based on the recommended cut chart and the plurality of features to be formed, wherein the processing path is configured to plan motion of a plasma arc emitted from the plasma arc cutting system coupled to the robotic arm to process the plurality of features from the workpiece, the plasma arc cutting system being modeled using a set of one or more consumables selected based on the recommended cut chart, and wherein the planned motion of the plasma arc accounts for influences in plasma arc dynamics introduced to the plasma arc from operating the robotic arm in a three-dimensional environment; and
   causing, by the computing device, actuation of at least one of the robotic arm or the plasma arc cutting system in accordance with the processing path to process the desired part on the workpiece.

2. The computer-implemented method of claim 1, wherein generating the processing path comprises:
   automatically identifying the set of one or more consumables based on the recommended cut chart;
   modeling the plasma arc cutting system using the set of one or more consumables and the recommended process settings provided by the recommended cut chart; and
   generating an initial simulation of the processing path that plans the motion of the plasma arc relative to the workpiece based on the plasma arc cutting system model and the recommended cut chart.

3. The computer-implemented method of claim 2, wherein the initial simulation is generated by integrating the recommended cut chart with the plasma arc cutting system model while compensating for the influences in plasma arc dynamics introduced during processing in the three-dimensional environment.

4. The computer-implemented method of claim 2, wherein generating the processing path further comprises generating a refined simulation of the processing path based on the initial simulation by adding to the initial simulation a multi-axis robotics model that identifies a sequence of motions for manipulating the robotic arm, wherein the refined simulation is adapted to manipulate the robotic arm to follow the processing path from the initial simulation.

5. The computer-implemented method of claim 4, wherein the sequence of motions of the robotic arm is simulated based on data for controlling the robotic arm accessible by the computing device.

6. The computer-implemented method of claim 5, wherein the data for controlling the robotic arm includes at least one of joint limitations, reach limitations, acceleration limitations or speed limitations of the robotic arm.

7. The computer-implemented method of claim 4, further comprising adjusting, during the refined simulation, at least a portion of the processing path from the initial simulation to account for one or more limitations of the robotic arm.

8. The computer-implemented method of claim 1, wherein the processing path is configured to control the robotic arm along at least 5 axes of motion relative to the workpiece which is defined by 3 axes.

9. The computer-implemented method of claim 1, wherein each cut chart in the library of cut charts specifies a suite of one or more parameters corresponding to a particular processing type, the one or more parameters comprising at least one of current, cut speed, workpiece material type, or workpiece material thickness.

10. The computer-implemented method of claim 1, wherein the desired parameters for operating the plasma arc cutting system include at least one of swirl direction, cut height, cut speed, current, kerf width, pierce location, lead-ins, or consumable type.

11. The computer-implemented method of claim 1, wherein the CAD data includes at least one of workpiece dimensions, desired part dimensions, or a reconstituted model of the workpiece.

12. The computer-implemented method of claim 1, wherein dynamically filtering a library of cut charts comprises:
presenting a set of operating options to the user by filtering the library of cut charts based on the input data to determine a set of possible cut charts that satisfy the input data, wherein the set of operating options correspond to operating parameters offered by the set of possible cut charts;
receiving user selection of desired operating options from the set of operating options; and
filtering the set of possible cut charts based on the user selection of desired operating options to drill down on the possible cut charts.

13. The computer-implemented method of claim 12, further comprising successively performing the presenting, receiving and filtering steps until the recommended cut chart is identified from the possible cut charts.

14. The computer-implemented method of claim 12, wherein the set of operating options are constrained by availability of one or more consumables of the plasma arc cutting system in an inventory accessible by the computing device.

15. The computer-implemented method of claim 12, wherein the set of operating options present at least one of an operating parameter range, cost range and consumable quality range available for user selection.

16. The computer-implemented method of claim 12, further comprising offering a secondary recommendation if the library of cut charts does not include a cut chart that satisfies the user selection.

17. The computer-implemented method of claim 1, wherein the influences in plasma arc dynamics accounted for by the processing path include motion in X, Y and Z axes of torch angularity relative to the three-dimensional workpiece.

18. The computer-implemented method of claim 1, wherein the influences in plasma arc dynamics accounted for by the processing path include at least one of cut direction for a given feature, swirl direction, cut height or kerf.

19. The computer-implemented method of claim 1, wherein generating the processing path further comprises accounting for an age of at least one consumable component of the plasma arc cutting system.

20. A computer-implemented method for planning a processing path relative to a three-dimensional workpiece by a plasma arc cutting system coupled to a robotic arm, the method comprising:
receiving, by a computing device, (i) input data from a user comprising data for specifying at least one desired part to be processed from the three-dimensional workpiece, (ii) data related to the plasma arc cutting system and (iii) data for controlling the robotic arm, wherein the computing device is in electrical communication with a library of cut charts that provide different combinations of operating parameters for different processing types;
intelligently selecting, by the computing device, based on the user input data and the data related to the plasma arc cutting system at least one suitable cut chart from the library of cut charts to process the at least one desired part from the three-dimensional workpiece, wherein the suitable cut chart specifies a set of process settings for configuring the plasma arc cutting system;
generating, by the computing device, a processing path about the three-dimensional workpiece in a first simulation by adapting the selected cut chart to a three-dimensional environment, including compensating for influences on plasma arc dynamics introduced during three-dimensional processing;
refining, by the computing device, the processing path from the first simulation in a second simulation by adding a sequence of motions for manipulating the robotic arm while the robotic arm emits a plasma arc from the plasma arc cutting system to process the at least one desired part from the workpiece, wherein the sequence of motions is generated using the data for controlling the robotic arm; and
causing, by the computing device, actuation of at least one of the robotic arm or the plasma arc cutting system in accordance with the processing path from the second simulation to process the desired part on the workpiece.

21. The computer-implemented method of claim 20, wherein generating the processing path in the first simulation includes:
automatically identifying a set of one or more consumables based on the suitable cut chart;
modeling the plasma arc cutting system using the set of one or more consumables and the set of process settings specified in the suitable cut chart; and
generating the first simulation of the processing path that plans the motion of the plasma arc relative to the workpiece based on the plasma arc cutting system model and the suitable cut chart.

22. The computer-implemented method of claim 21, wherein the first simulation is generated by integrating the suitable cut chart with the plasma arc cutting system model while compensating for the influences in plasma arc dynamics introduced during processing in a three-dimensional environment.

23. The computer-implemented method of claim 20, wherein intelligently selecting a suitable cut chart comprises successively and dynamically filtering the library of cut charts based on the user input data and user selection to identify the suitable cut chart for processing the desired part from the workpiece.

24. The computer-implemented method of claim 23, further comprising presenting a set of operating options for selection by the user at each filtering step, the set of operating options being constrained by availability of one or more consumables of the plasma arc cutting system in an inventory accessible by the computing device.

25. The computer-implemented method of claim 20, wherein the plasma arc dynamics compensated for by the processing path in the first simulation include motion in X, Y and Z axes of torch angularity relative to the three-dimensional workpiece.

26. The computer-implemented method of claim 20, wherein the plasma arc dynamics compensated for by the processing path in the first simulation include an effect on the plasma arc by at least one of cut direction for a given feature, swirl direction, cut height or kerf.

27. The computer-implemented method of claim 20, wherein the plasma arc dynamics compensated for by the processing path in the first simulation include an arc diameter or arc shape.

28. The computer-implemented method of claim 20, further comprising adjusting the processing path in at least one of the first or second simulation to compensate for an age of at least one consumable component of the plasma arc cutting system.

29. The computer-implemented method of claim 20, wherein the data for controlling the robotic arm includes at least one of joint limitations, reach limitations, acceleration limitations or speed limitations of the robotic arm.

30. A computer-implemented expertise integration system for planning a processing path relative to a three-dimensional workpiece, the expertise integration system being in electrical communication with a plasma arc cutting system coupled to a robotic arm, the expertise integration system comprising:
a computing device having a memory that stores programmatic instructions and a processor that executes the programmatic instructions to:
receive input data from a user comprising (i) Computer-Aided Design (CAD) data for specifying at least one desired part to be processed from the three-dimensional workpiece, and (ii) one or more desired parameters for operating the plasma arc cutting system;
identify a plurality of features of the at least one desired part to be formed on the three-dimensional workpiece based on the CAD data;
dynamically filter a library of cut charts based on the plurality of features and the desired operating parameters to determine at least one recommended cut chart for processing the plurality of features, wherein the recommended cut chart comprises a set of recommended process settings for the plasma arc cutting system;
generate the processing path based on the recommended cut chart and the plurality of features to be formed, wherein the processing path plans motion of a plasma arc emitted from the plasma arc cutting system coupled to the robotic arm to process the plurality of features from the workpiece, the plasma arc cutting system being modeled using a set of one or more consumables selected based on the recommended cut chart, and wherein the planned motion of the plasma arc accounts for influences in plasma arc dynamics introduced to the plasma arc from operating the robotic arm in a three-dimensional environment; and
cause to actuate at least one of the robotic arm or the plasma arc cutting system in accordance with the processing path to process the desired part on the workpiece.

31. The computer-implemented expertise integration system of claim 30, wherein the programmatic instructions executable by the processor to generate the processing path comprises programmatic instructions executable by the processor to:
automatically identify the set of one or more consumables based on the recommended cut chart;
model the plasma arc cutting system using the set of one or more consumables and the recommended process settings provided by the recommended cut chart; and
generate an initial simulation of the processing path that plans the motion of the plasma arc relative to the workpiece based on the plasma arc cutting system model and the recommended cut chart.

32. The computer-implemented expertise integration system of claim 31, wherein the programmatic instructions executable by the processor to generate the processing path further comprises programmatic instructions executable by the processor to generate a refined simulation of the processing path based on the initial simulation by adding to the initial simulation a multi-axis robotics model that identifies a sequence of motions for manipulating the robotic arm, wherein the refined simulation is adapted to manipulate the robotic arm to follow the processing path from the initial simulation.

33. The computer-implemented expertise integration system of claim 30, wherein each cut chart in the library of cut charts specifies a suite of one or more parameters corresponding to a particular processing type, the one or more parameters comprising at least one of current, cut speed, workpiece material type, or workpiece material thickness.

34. The computer-implemented expertise integration system of claim 30, wherein the desired parameters for operating the plasma arc cutting system includes at least one of swirl direction, cut height, cut speed, current, kerf width, pierce location, lead-ins, or consumable type.

35. The computer-implemented expertise integration system of claim 30, wherein the CAD data includes at least one of workpiece dimensions, desired part dimensions, or a reconstituted model of the workpiece.

36. The computer-implemented expertise integration system of claim 30, wherein the programmatic instructions executable by the processor to dynamically filter a library of cut charts further comprises programmatic instructions executable by the processor to:
present a set of operating options to the user by filtering the library of cut charts based on the input data to determine a set of possible cut charts that satisfy the input data, wherein the set of operating options correspond to operating parameters offered by the set of possible cut charts;

receive user selection of desired operating options from the set of operating options; and filter the set of possible cut charts based on the user selection of desired operating options to drill down on the possible cut charts.

37. The computer-implemented expertise integration system of claim 36, further comprising programmatic instructions executable by the processor to successively perform the present, receive and filter steps until the recommended cut chart is identified from the possible cut charts.

38. The computer-implemented expertise integration system of claim 36, wherein the set of operating options are constrained by availability of one or more consumables of the plasma arc cutting system in an inventory accessible by the expertise integration system.

39. The computer-implemented expertise integration system of claim 30, wherein the influences in plasma arc dynamics accounted for by the processing path include motion in X, Y and Z axes of torch angularity relative to the three-dimensional workpiece.

40. The computer-implemented expertise integration system of claim 30, wherein the influences in plasma arc dynamics accounted for by the processing path include at least one of cut direction for a given feature, swirl direction, cut height or kerf.

* * * * *

UNITED STATES PATENT AND TRADEMARK OFFICE
CERTIFICATE OF CORRECTION

Page 1 of 1

PATENT NO. : 12,269,166 B2
APPLICATION NO. : 17/689267
DATED : April 8, 2025
INVENTOR(S) : Garen Cakmak et al.

It is certified that error appears in the above-identified patent and that said Letters Patent is hereby corrected as shown below:

In the Claims

Claim 1:
Column 20, Line 39 reads:
"configured to plan motion of a plasma are emitted from"
Should read:
-- configured to plan motion of a plasma arc emitted from --

Claim 1:
Column 20, Line 42 reads:
"piece, the plasma are cutting system being modeled"
Should read:
-- piece, the plasma arc cutting system being modeled --

Claim 1:
Column 20, Line 45 reads:
"planned motion of the plasma are accounts for influ- "
Should read:
-- planned motion of the plasma arc accounts for influ- --

Claim 1:
Column 20, Lines 46-47 read:
"ences in plasma are dynamics introduced to the plasma
are from operating the robotic arm in a three-dimen- "
Should read:
-- ences in plasma arc dynamics introduced to the plasma
arc from operating the robotic arm in a three-dimen- --

Signed and Sealed this
Fifteenth Day of July, 2025

Coke Morgan Stewart
*Acting Director of the United States Patent and Trademark Office*